United States Patent [19]

Jackson

[11] 3,898,392

[45] Aug. 5, 1975

[54] ANSWER-BACK ASSEMBLY FOR A KEY TELEPHONE SYSTEM

[75] Inventor: Joseph Monroe Jackson, Menlo Park, Calif.

[73] Assignee: Litton Systems, Inc., Sunnyvale, Calif.

[22] Filed: Feb. 25, 1974

[21] Appl. No.: 445,083

[52] U.S. Cl. .............. 179/99; 179/1 H; 179/18 AB; 179/81 B

[51] Int. Cl.$^2$ .............. H04M 1/60

[58] Field of Search .............. 179/99, 1 H, 81 B, 37, 179/38, 18 AD, 1 HF, 18 BF, 27 FB, 84 R

[56] References Cited

UNITED STATES PATENTS

| | | | |
|---|---|---|---|
| 2,317,358 | 4/1943 | Campbell | 179/1 H |
| 2,427,496 | 9/1947 | Feldscher | 179/1 H |
| 3,427,407 | 2/1969 | Heck et al. | 179/99 |
| 3,703,611 | 11/1972 | Kiyomiya et al. | 179/99 |
| 3,787,640 | 1/1974 | Bush et al. | 179/99 |

*Primary Examiner*—Kathleen H. Claffy
*Assistant Examiner*—Gerald L. Brigance
*Attorney, Agent, or Firm*—Ronald M. Goldman

[57] ABSTRACT

The invention relates to a conventional key telephone communication system of the type having a central and a plurality of remote telephone stations interconnected together and further having a paging or announcing channel, as variously termed, provided by a pair of wires that extend between the central station and, in multiple, to each of the remote stations. Each of the remote stations contains an amplifier and loudspeaker assembly to permit an announcement, initiated at the central station, to be made over the loudspeaker of the selected remote station, irrespective of the position of the remote station telephone handset. The improvement includes switch means, a microphone, and a microphone amplifier at each station. In its unoperated position the switch means completes an electrical circuit from the paging channel to the input of the amplifier-loudspeaker combination to permit passage therethrough of the incoming announcement, and in its operated position the switch means interrupts said circuit to the amplifier and loudspeaker combination and connects the output of the microphone amplifier to the announcement channel. The improvement allows a received announcement to be answered over the announcement channel directly by simple depression of one switch without the necessity of removing the telephone handset at the remote station or, if the telephone handset is in use over one of the other party lines, without requiring an existing conversation to be placed on "hold."

1 Claim, 1 Drawing Figure

PATENTED AUG 5 1975 3,898,392
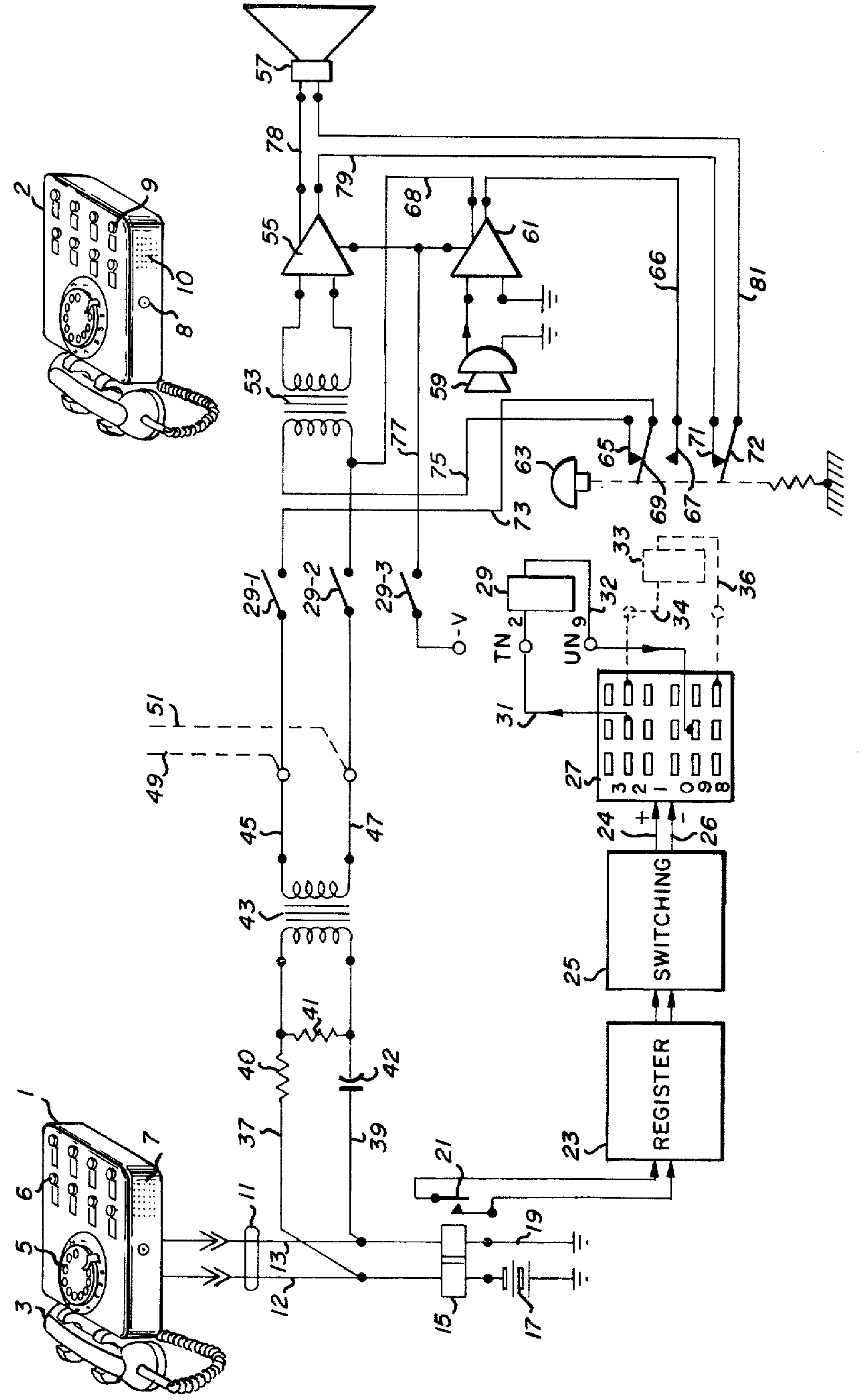

ANSWER-BACK ASSEMBLY FOR A KEY TELEPHONE SYSTEM

FIELD OF THE INVENTION

This invention relates to key telephone systems and, more particularly, to the novel answer-back assembly for use in a key telephone system.

BACKGROUND OF THE INVENTION

The key telephone system is a known type of communications system in which a plurality of telephone stations are interconnected by a plurality of telephone lines and a key switching means at the stations permits each of the separate stations to individually access any one of such telephone lines. Typically each station in a key system includes a telephone handset and a base which contains the externally visible dial instrumentation that allows dialing out calls from the station and a plurality of switches to allow connection of the station to the one of the telephone lines associated with each respective switch. Other features are frequently included, the exact nature of which are not relevant to the present invention, are known, and are adequately explained in the literature.

One of the features frequently found in the key telephone system is the announcing system. That is, calls coming into a facility initiate an indication at the one of the telephone stations denoted the "central station," and this is typically operated by a telephone receptionist or operator. The operator operates the line key switch means of that line, removes the handset and ascertains the party to whom the calling party desires to be connected. The operator may signal that party directly or may make an audible announcement over the announcing system. The announcing system is a feature in which all of the stations in the system are interconnected by a voice communications channel, typically a pair of wire lines. And each station includes in the station base an amplifier and a loudspeaker for acoustically reproducing incoming electrical audio information. Additionally a relay switch means controlled by the central station connects the amplifier input of the selected station to the announcing channel which extends to that station. Inasmuch as the lines of the announcing channel are connected in multiple to and extend over a single pair of wires to each station, the switching system selects only the relay switch means of the desired remote station for operation so that the incoming message from the telephone receptionist is reproduced only at the selected station and not the other remote stations. Station selection is accomplished by a dial operated switching system conventional in the telephone art. At the central station the operator dials the correct telephone extension number of the selected remote station. This information is received on a register and switching equipment automatically selects the single line relay switch means associated with the selected remote station. The contacts of the selected line relay connect through the announcing line to the loudspeaker-amplifier apparatus at that remote station.

An answer-back function enables one who receives the announcement over the remote station loudspeaker to reply to the telephone receptionist. One method is simply to remove the telephone handset, go "off hook," operate the line key of the announcing channel which places the station telephone transmitter and receiver in circuit on the announcing line. This of course necessitates removing the handset from the "cradle." On the other hand, I have heard of a system which does not require removal of the handset to reply or answer back. Such system I believe included an additional pair of wires to form an answering channel similar to the announcing channel which could be accessed by each of the separate stations. A microphone located at the station in combination with other amplifying apparatus by operation of a switch at the station could apply the audio signal over the auxiliary answer channel to be received by the receiving equipment installed in the telephone receptionist's key telephone equipment. There thus exists in the prior art, answer-back features which require use of the telephone handset or which require installation of an additional set of lines between the central station and each of the remote stations to provide answer back capability.

OBJECTS OF THE INVENTION

Accordingly, it is an object of my invention to provide a simple answer-back assembly for an existing key telephone system without the necessity of adding an additional set of telephone lines between the stations or to the central station.

It is an additional object of my invention to provide an answer-back feature in which answer may be initiated by simply depressing a single switch without the necessity of removing the telephone handset from its cradle on the station base.

And it is a still additional object of my invention to provide an answer-back feature which allows answer-back over the announcing lines while the telephone handset is off-hook and connected in circuit with another telephone line.

BRIEF SUMMARY OF THE INVENTION

In accordance with the foregoing objects the invention includes in a key telephone system of the type having a plurality of telephone stations, and a paging or announcing communication line extended to and adapted for connection in circuit with an announcing amplifier and loudspeaker arrangement located in each of the telephone stations, the improvement comprising at the station a microphone, amplifier means having an input coupled to said microphone input, and manually operable switch means for disconnecting the connection to the input of said announcing amplifier and said loudspeaker, and applying the output of said microphone amplifier to the said line, whereby by simply pushing a button the paged party may reply into the paging network to communicate a message directly to the telephone receptionist without the necessity of removing the station handset if on-hook, or without the necessity of placing another line on "hold" in order to communicate with the operator.

The foregoing objects and advantages of my invention and the structure characteristic of my invention, as well as improvements and modifications thereto, become more apparent and are better understood through study of the detailed description of the preferred embodiment of my invention which follows, taken together with the FIGURE of the drawing.

DESCRIPTION OF DRAWINGS

The FIGURE of the drawing illustrates my invention in an answer-back assembly within a partially illustrated conventional key telephone system.

DETAILED DESCRIPTION OF THE INVENTION

The central telephone station in a key telephone system is represented as 1 in FIG. 1 and one remote station appears as 2. These illustrations present merely the exemplary outer physical appearance of the stations as background inasmuch as the internal circuitry is widely known. Additional remote stations similar to station 2 in appearance and circuitry are typically found in the key telephone system and are not illustrated. Each of the telephone stations includes a telephone handset 3 containing the transmitter and receiver, a dial or touch tone instrumentation 5, a plurality of individual "line-key" and auxiliary switches 6, all of which are conventional. Moreover each of the stations in the key telephone systems is connected in multiple to each pair of lines forming respective communications channels, which lines are conventionally extended to each of the stations in the system and to a respective one of the key switches 6 so that by operating a particular switch the station can be placed on the telephone line associated therewith. Such telephone lines are not necessary to the understanding of the invention and for convenience they are not illustrated. One such key telephone system is that distributed and sold under the trademark "Litkey" by a division of Litton, Sunnyvale, Calif.

A pair of wires, 12 and 13, comprising a line 11, extend from station 1 and are connected to one terminal of a respective one of the two windings of a pulsing relay 15. The remaining terminal of each relay is connected to ground via lead 19 and to the negative terminal of battery 17, which is suitably on the order of 24 volts. Relay 15 includes a pulsing contact 21 connected to the input of a register 23, symbolically illustrated, which in turn is connected to the input of a switching system 25, symbolically illustrated, and the output of switching network 25 is connected via leads 24 and 26 to a terminal block 27. The terminal block 27 has contacts arranged in rows to designate each unit of the tens and units digit of the extension numbers associated with each of the plurality of remote stations. The terminal block illustrated includes numbers 1, 2 and 3 for the tens digit, and zero, 9 and 8 for the units digit, and contains provisions for only three remote stations. A station selection relay 29 is associated with the remote station 2, illustrated in the FIGURE. One end of the relay winding is connected via lead 31 to one of the terminals in the designated row 2, and the other end of the winding is connected via lead 32 to one of the terminals in the units row designated 9. The station selection relay includes three sets of normally open make contacts, 29-1, 29-2, and 29-3. For purposes of further illustration and clarity, I have also disclosed a second line selection relay 33 illustrated in dash lines, which is associated with another telephone station not illustrated, and an extension number 28. As represented by dash line 34, one end of the relay winding is connected between a terminal on the designated 2 row of block 27, and the other end of the relay winding is connected by a lead represented by dash line 36 to a terminal in the units digit row designated 8. A line selection relay, such as illustrated in connection with station 2, is provided for each station in the system and such relay is connected as described.

The electrical leads 37 and 39 are connected to conductors 12 and 13, respectively. Leads 37 and 39 are the input to the voice communication channel, i.e., the path for communicating audio modulated electrical signals between the central station and the remote stations. A conventional impedance matching network consisting of resistors 40 and 41 and a capacitor 42 are included in the line. Capacitor 42 also is a blocking capacitor to block direct current. An isolation transformer 43 has one winding connected across lines 37 and 39. The other winding of isolation transformer 43 is connected across leads 45 and 47. It is noted that the second winding of isolation transformer 43 is also coupled to each of the other remote telephone extensions in the particular key telephone system. This parallel connection is indicated by the dash lines 49 and 51. Station selection relay 29 and relay "make" contacts 29-1, 29-2, and 29-3 are located at the remote station. Contacts 29-1 and 29-2 are connected electrically in series with line 45 and 47. An isolation transformer 53, an amplifier 55, a loudspeaker 57, which are conventional to key telephone systems containing an announcing feature, are located in the station base. A microphone 59 is connected between ground and the input of audio amplifier 61 and a source of voltage, —V. Additionally a switch 63 is provided. Switch 63 is a manually operable depressible switch with a spring return. The switch includes a set of transfer contacts consisting of stationary contacts 65 and 67, and a movable transfer contact 69, and a set of "break" contacts including a stationary contact 71 and a movable contact 72, symbolically illustrated in the drawing. In the normal position the contacts 65 and 69 are closed and contacts 71 and 72 are closed, as illustrated. Conveniently, the key switch 63 is of the same variety found on the remote stations and corresponds to the switch 9 in the illustrated station. The loudspeaker 57 is normally mounted behind a perforated portion of the base, such as perforations 10 in the station base, so as to permit exit of reproduced sounds, and the microphone may be installed anywhere within the base which is accessible to external sounds. For convenience I have represented the microphone input as the opening 8 in the illustrated station. One end of the make contact 29-1 is electrically connected in a circuit via lead 73 to transfer contact 69 of switch 63. Contact 65 of switch 63 is connected via lead 75 to one end of the winding of isolation transformer 53, and the other end of isolation transformer 53 is connected to contact 29-2. Additionally the output of amplifier 61 is connected via lead 66 to make contact 67 and the amplifier common is connected electrically in circuit via lead 68 to the same end of the primary of isolation transformer 53 as make contact 29-2. The output of secondary of transformer 53 is coupled to the input of amplifier 55. The source of voltage, V, is connected to one of the contacts of contacts 29-3 and the other contact thereof is connected via lead 77 to the bias input terminals of each of the amplifiers 55 and 61 to provide power therefor. One output terminal of amplifier 55 is connected via lead 79 to contact 71 and the contact 72 is connected via lead 81 to one input terminal of loudspeaker 57. The other output terminal of amplifier 55 is connected in circuit with the other input terminal of the loudspeaker such as by lead 78.

In the normal position of switch 63 the output of amplifier 55 is thus connected to the input of loudspeaker 57. Likewise an electrical path between contact 29-1 is provided via break contacts 69 and 65 and line 75 to the primary of transformer 53. One of the key switches 7 at station 1 is associated with the announcement channel.

To make an announcement the telephone receptionist removes handset 3 and depresses switch 7. The station 1 accesses line pair 11 consisting of the two wires, 12 and 13. This completes a DC current circuit through pulsing relay 15. The pulsing relay 15 is of the conventional two-coil structure. And direct current flows from the battery 17 through one relay winding over line 12 through the circuitry within the station 1 including the telephone receiver and transmitter, over line 13 through the second winding of relay 15 over lead 19 back to ground and the other terminal of battery 17. The relay windings are magnetically in phase so as to produce additive magnetic fields. Relay 15 operates its contacts 21 which closes a circuit to actuate the register 23, symbolically illustrated. The telephone receptionist then dials the digits of the remote station to which she wishes to make an announcement, such as station extension 29, the assigned number of station 2. The digit selection is translated into a series of pulses or interruptions in the current flow over lines 12 and 13. When the digit 9 is dialed, the current to relay 15 is interrupted nine times in the pulsing period, and pulsing contacts 21 open and close nine times. In this manner the serial digit information is presented to and stored in register 23. The switching network 25 receives the dialed digit information and effects the selection of the dialed station at a selection block 27. Switching network 25 applies a positive polarity voltage to a selected terminal on the selection block representative of the tens unit of the called station and applies a negative polarity potential to the terminals on the block 27 which are representative of the units digit of the called station. Thus in the embodiment illustrated, a positive potential is applied to all terminals in row 2 on block 27 representative of the dialed tens digit "2" and a negative potential is applied to all the terminals in row 9 of the units digit rows representative of the dialed units digit 9. This completes a DC current path through the winding of station selection relay 29, associated with remote telephone station 2 having extension number 29 over leads 31 and 32. Selection relay 29 operates and closes contacts 29-1, 29-2 and 29-3 to establish the connection to the apparatus of the selected station 2. Closed contacts 29-1 and 29-2 place the primary of transformer 53 in circuit across lines 45 and 47 and power from source V is supplied to amplifiers 55 and 61 via closed make contacts 29-3.

The telephone receptionist at station 1 speaks into the transmitter in handset 3 to modulate the DC current. The transmitter converts the audio information into an AC electrical signal which passes over lines 37 and 39, impedance network 40, 41 and 42, through transformer 43 over lines 45 and 47, closed contacts 29-1 and 29-2, break contacts 65 and 69 of switch 63, through transformer 53 to the amplifier 55. Amplifier 55 in turn amplifies the received AC signals and applies same via break contacts 71 and 72 of switch 63 to loudspeaker 57, which in turn reproduces the audio electrical signal into sound. The operator thus relates some information to the party at the selected station, extension 29 in the example of this embodiment. As an example, the operator may announce, "Mr. Smith, there is a Mr. Jones wishing to speak to you on line 5." Assuming Mr. Smith is present, he might "pick up" line 5 by operating the associated line key directly, or if he does not wish to speak with Mr. Jones, he may now depress answer-back switch 63 to its operated position and while holding the answer-back switch in the operated position, state to the operator that he does not wish to speak with Mr. Jones and to have him call back later. The operation of switch 63 to its depressed position interrupts the circuit to the primary winding of transformer 53 by opening contact 65 and completes a circuit via contacts 69 and 67 to the output of amplifier 61. Likewise the circuit to loudspeaker 57 is interrupted at contacts 71 and 72 so as to prevent establishment of an undesirable acoustic feedback circuit. The audio message related by Mr. Smith is picked up at microphone 59 and applied to the input of microphone amplifier 61. Microphone amplifier 61 amplifies or increases the level of the electrical signal and applies same to line 45 via contacts 67, 69, lead 73, and contacts 29-1.

This AC signal passes over line 45, through one winding of transformer 43, line 47, make contact 29-2, lead 68 to the remaining terminal of amplifier 61. Current in the one winding induces a corresponding AC voltage in the other winding of transformer 43 and this voltage is applied across line 39 and line 37; and is applied to lines 12 and 13 at the central station. In turn, the AC audio voltages are coupled via lines 12 and 13 to the telephone receiver in handset 3 and the receiver converts the electrical signal into audible sound. It is apparent from the aforedescribed embodiment that the paging or announcing circuit as well as the answer-back circuit are not wired into any circuit containing the telephone handset. Thus operation of switch 63 is independent of whether or not the handset in on-hook or off-hook. Then too, the electrical signals are transmitted over existing telephone lines—the announcement channel. The incoming announcement is thus received and answered irrespective of the position of the handset. The answer or reply to the announcement is enabled by simple depression of switch 63. It is apparent that by the simple addition of a microphone, such as 59, and amplifier 61, a switch 63 and the associated wiring, that the feature of my invention may be conveniently added to the existing system to provide the answer-back function. The system is economical, comprising a few relatively inexpensive parts, and uses existing communications channels.

It is believed that the foregoing description of a preferred embodiment of my invention is sufficient in detail to enable one skilled in the art to make and use my invention. However it is expressly understood that my invention is not limited to those details since suitable substitutions and equivalents will suggest themselves to one skilled in the art upon reading this specification. Accordingly it is respectfully requested that my invention be broadly construed within the full spirit and scope of the appended claims.

What I claim is:

1. In a key telephone system having a central station, a plurality of remote stations, and means for establishing telephone communications between such stations, the combination therewith including:

a first isolation transformer associated with said central station having first and second windings;

means coupling said first winding in circuit with said central station;

relay means associated with a remote station, said relay means having first, second and third normally open sets of contacts, each of said contact sets operable to the closed position in response to energization of said relay means for completing an electrical path through said contact set;

a source of DC power;

first and second electrical leads coupled, respectively, between one end and the other end of said second winding of said first transformer and, respectively, to one contact in each of said first and second contact sets to establish two electrically conductive paths therebetween;

a third electrical lead connected between said DC source and one contact of said third contact set to establish an electrically conductive path therebetween;

a second isolation transformer having a primary winding and a secondary winding, said primary winding having first and second winding ends;

a first amplifier having an input and an output and wherein said input is coupled to said secondary winding for receiving AC electrical voltages therefrom;

a loudspeaker for converting AC to audio energy having an input;

a microphone having an output;

a second amplifier having an input and first and second outputs and wherein said input is coupled to said microphone for receiving electrical voltages therefrom;

each of said first and second amplifiers having a DC input for receiving DC power;

manually depressible spring return type switch means, said switch means having a normal position and an operated position and having a first set of break contacts and a set of transfer contacts, including a break contact, a make contact, and a transfer contact, and further having a spring for restoring said switch means to said normal position;

first circuit means connecting said output of said first amplifier, said first set of break contacts and said loudspeaker in electrical series circuit for permitting coupling of electrical voltages between said amplifier and loudspeaker only when said switch means is in the normal position;

second circuit means connecting an output of said second amplifier in circuit with said make contact in said set of transfer contacts whereby said output is connected electrically in circuit with said transfer contact only when said switch means is in the operated position;

third electrical circuit means connecting the second output terminal of said second amplifier in common with said first end of said primary winding of said second transformer;

fourth circuit means connecting the second end of said primary winding to said break contact of said set of transfer contacts whereby an electrical circuit between said transfer contact and said primary is established only when said switch means is in its normal position;

fourth electrical lead means connected between the other contact of said first relay contact set and said transfer contact of said switch transfer contact set;

fifth electrical lead means connected between the other contact of said second relay contact set and said first end of said primary winding of said second transformer;

sixth electrical lead means connected in circuit between the other contact of said third relay contact set and said DC input of each of said first and second amplifiers;

and means controlled by said central station for selectively energizing said relay means.

* * * * *